(12) United States Patent
Lu

(10) Patent No.: US 11,179,002 B2
(45) Date of Patent: Nov. 23, 2021

(54) HEATING DEVICE AND AIR FRYER

(71) Applicant: SUZHOU BAOSHENG ELECTRICAL APPLIANCE CO., LTD, Suzhou (CN)

(72) Inventor: Weiling Lu, Suzhou (CN)

(73) Assignee: SUZHOU BAOSHENG ELECTRICAL APPLIANCE CO. LTD, Suzhou (CN)

( * ) Notice: Subject to any disclaimer, the term of this patent is extended or adjusted under 35 U.S.C. 154(b) by 317 days.

(21) Appl. No.: 16/403,692

(22) Filed: May 6, 2019

(65) Prior Publication Data
US 2020/0229638 A1 Jul. 23, 2020

(30) Foreign Application Priority Data

Jan. 18, 2019 (CN) .......................... 201920085873.5

(51) Int. Cl.
*A47J 37/06* (2006.01)
(52) U.S. Cl.
CPC ................................. *A47J 37/0641* (2013.01)
(58) Field of Classification Search
CPC ........ A47J 37/0641; A47J 37/06; A47J 37/00; A47J 27/002; A47J 36/06; A47J 37/103
USPC .......... 219/391, 392, 400, 413, 494; 99/348, 99/447
See application file for complete search history.

(56) References Cited

U.S. PATENT DOCUMENTS

| 5,165,328 A | 11/1992 | Erickson et al. |
| 2009/0321410 A1* | 12/2009 | Moon ..................... F26B 9/003 219/392 |
| 2015/0122137 A1 | 5/2015 | Chang |

FOREIGN PATENT DOCUMENTS

| CN | 201782549 U | 4/2011 |
| CN | 202426316 U | 9/2012 |
| CN | 202604591 U | 12/2012 |
| CN | 20302800 U | 7/2013 |
| CN | 203873601 U | 10/2014 |
| CN | 204133232 U | 2/2015 |
| CN | 204765167 U | 11/2015 |
| CN | 105615674 A | 6/2016 |
| CN | 207270287 U | 4/2018 |
| EP | 1781154 B1 | 3/2009 |
| KR | 200300729 Y1 | 1/2003 |

* cited by examiner

Primary Examiner — Phuong T Nguyen
(74) Attorney, Agent, or Firm — Haug Partners LLP

(57) ABSTRACT

A heating device comprises a housing, a driving member a fan, a heating member and a cover. The housing is formed with a cavity and a plurality of holes communicating with the cavity. The driving member is disposed in the cavity and has a driving shaft extending along a first direction. The fan is disposed on the driving shaft and faces the holes. The heating element is disposed between the fan and the plurality of holes. The cover has annular steps. The diameter of the outer surface of the annular steps of the cover is gradually reduced in the first direction. The annular steps can accommodate pots of different diameter openings. With only one heating device that can be used with several pots, the user can cook different sizes of food, and save storage space and cost.

7 Claims, 4 Drawing Sheets

HEATING DEVICE AND AIR FRYER

CROSS-REFERENCE TO RELATED APPLICATIONS

This application claims priority to Chinese Patent Application CN201920085873.5 filed on 18 Jan. 2019.

FIELD OF THE INVENTION

This invention relates to a heating device, in particular to a heating device for an air fryer and an air fryer comprising the heating device.

BACKGROUND OF THE INVENTION

The conventional air fryer usually has a pot body of fixed volume. To fry foods of different sizes, people often use fryers of different sizes, which not only occupy storage space but also are expensive.

SUMMARY OF THE INVENTION

A heating device comprises a housing, a driving member a fan, a heating member and a cover. The housing is formed with a cavity, with a heating member within the cavity. The cover has annular steps with the diameter of the outer surface of the annular steps being gradually reduced in an axial direction. The annular steps can accommodate different pots having
 different diameter openings, with the diameters of the steps of the cover being the same as the diameters of the different openings of the different pots.

BRIEF DESCRIPTION OF THE DRAWINGS

A wide variety of practical and useful embodiments will be more readily understood through the following detailed description of certain exemplary embodiments, concerning the accompanying exemplary drawings in which.

Figure 1:
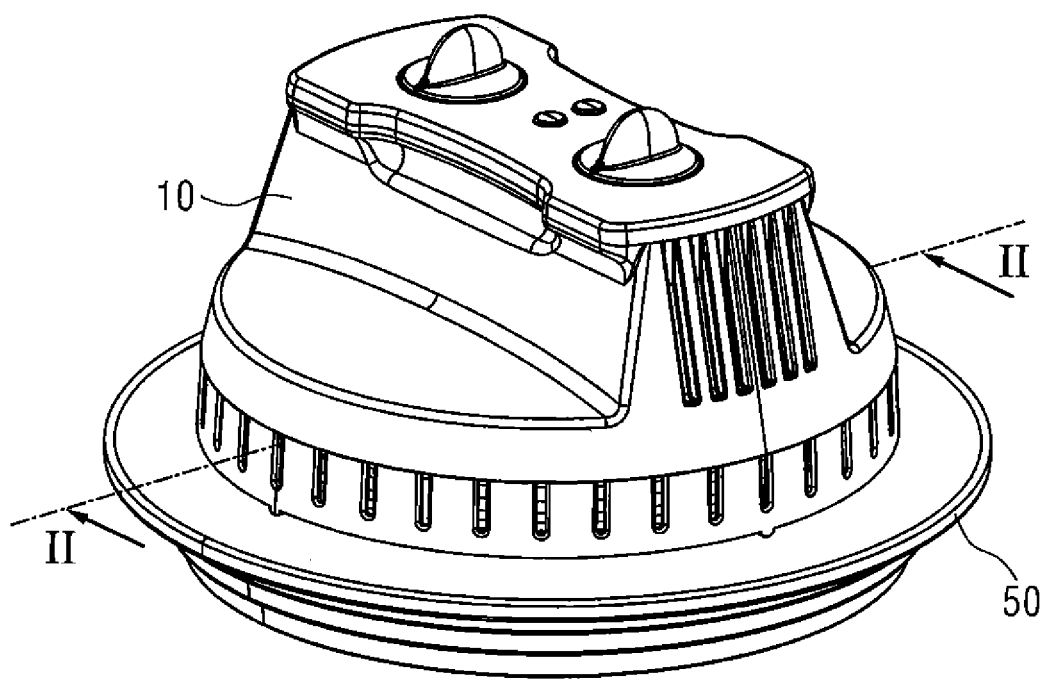
FIG. 1 is a perspective view showing an exemplary heating device.

PARTS AND NUMBERS SHOWN IN THE DRAWINGS 10 housing
11 first portion
12 cavity
13 hole
14 connecting portion
142 first engaging part
144 blocking part
15 apertures
16 restriction portion
17 concave member
18 operating surface
19 second portion
20 driving member
22 driving shaft
30 fan
40 heating member
50 cover
52 second engaging part
70 switch
Z first direction

DETAILED DESCRIPTION OF THE EMBODIMENTS

The above and other objects, features and other advantages of the present invention will be more clearly understood from the following detailed description taken in conjunction with the accompanying drawings. It should be noted that like reference numerals refer to like parts throughout the several views.

"Exemplary" means "serving as an example, instance or description" and any illustration or embodiment described herein as "exemplary" should not be construed as a more preferred or advantageous technical solution.

The "first" and "second" described herein are not intended to distinguish their importance.

Figure 2:
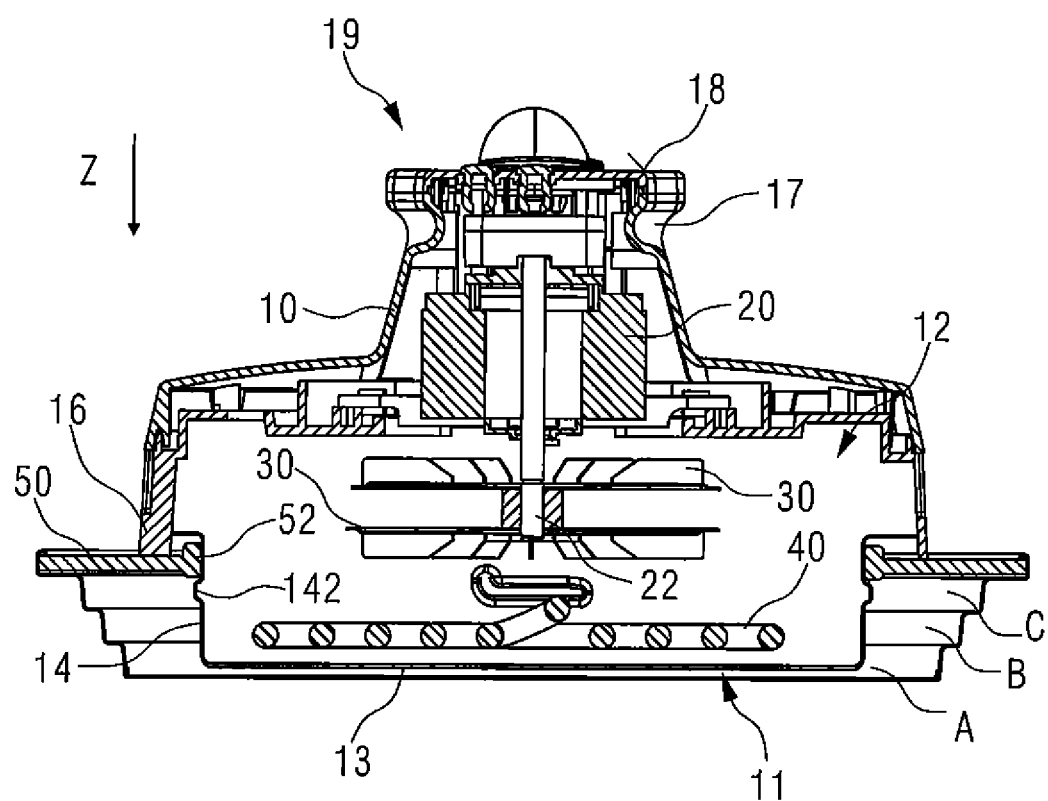
FIG. 2 is a cross-sectional view of the heating device, taken in the direction by the arrow II in FIG. 1.

FIG. 1 is an exploded view showing an exemplary heating device. FIG. 2 is a cross-sectional view of the heating device, taken in the direction by the arrow II in FIG. 1. Referring to FIG. 1 and FIG. 2, the heating device comprises a housing 10, a driving member 20, a fan 30, a heating member 40, and a cover 50.

Referring to FIG. 2, the first direction Z is the downward direction; the housing 10 is formed with a cavity 12. The housing 10 has first portion 11 downstream and a second portion 19 upstream along the first direction Z. The first portion 11 has a plurality of holes 13 communicating with the cavity 12. The drive member 20 is disposed in the cavity 12. In an exemplary embodiment, the drive member 20 is a motor having a driving shaft 22 extending along the first direction Z. The fan 30 is disposed on the driving shaft 22 and faces the holes 13. The heating member 40 is a heating coil disposed between the fan 30 and the holes 13. The driving member 20 can drive the fan 30 to rotate inside the housing 10 so that the air in cavity 12 is heated by the heating member 40, and then the hot air is discharged through the holes 13 at the second portion 19.

The cover 50 has an annular stepped shape and is sleeved on the housing 10. The axis of the cover extends along the first direction. The diameter of the outer surface of the cover 50 is gradually reduced along the first direction Z from top to bottom in FIG. 2. In an exemplary embodiment, the cover 50 has three steps A, B, and C. The step A in the bottom has a diameter D1; the step B in the middle has a diameter D2; the step C in the bottom has a diameter D3.D1<D2<D3.

The cover 50 is transparent and made of a heat resistant material to that the user can see the cooked food in the pot during cooking. However, it is not limited thereto, and in other exemplary embodiments, a non-transparent design may also be adopted according to actual needs.

The heating device when used as an air fryer has a cover 50 having the annular stepped shape. The cover 50 is sleeved on the housing 10, and the hot air is discharged from the cover 50. One cover 50 can be used different pots having different diameters, the openings of the pots being accommodated via the annular steps with gradually decreasing diameters. The diameter of the annular step can match the opening of the pot with the same diameter. When an annular step matches the opening of the pot, the closest annular step with a larger diameter covers the pot; therefore using only one heating device that can accommodate several pots can meet a variety of user requirements, which can save storage space and cost.

Figure 3:
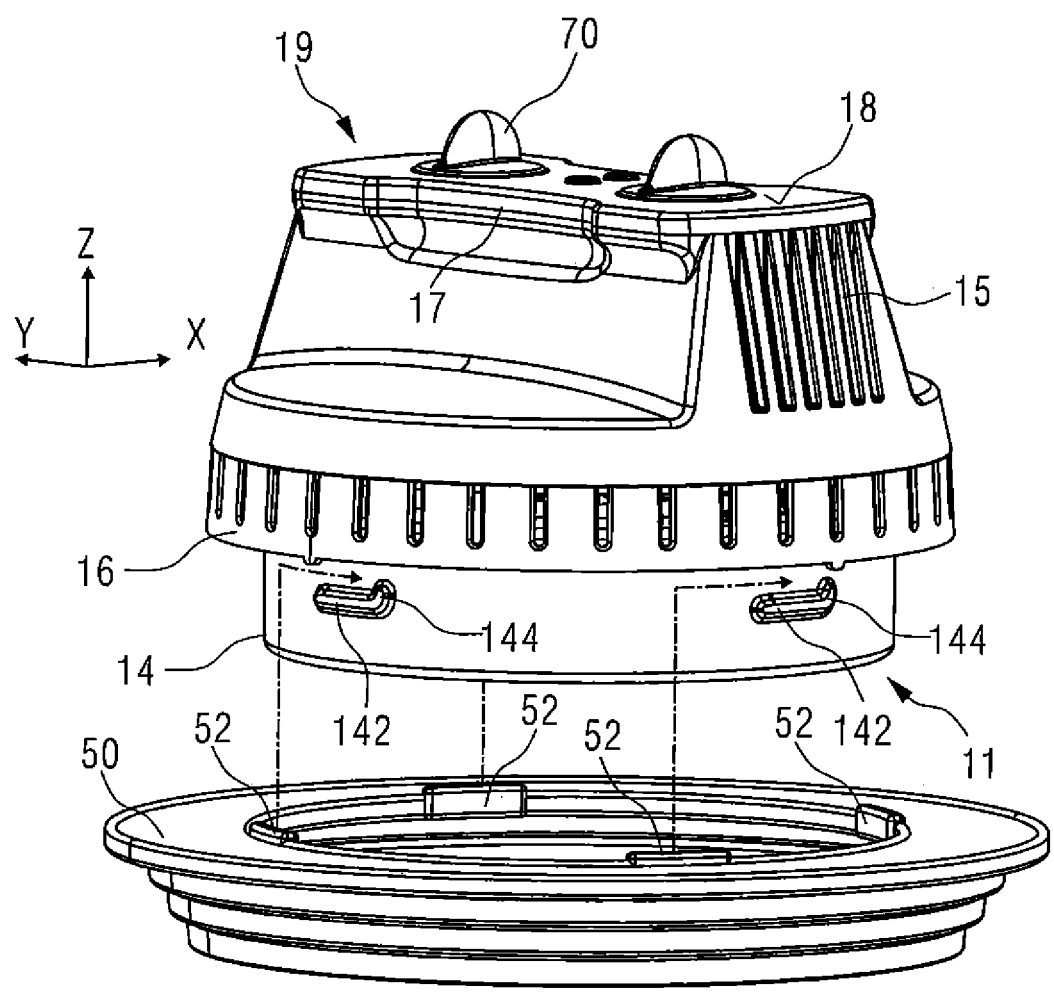
FIG. 3 is an exploded perspective view of the heating device in FIG. 1.

FIG. 3 is an exploded view of the heating device in FIG. 1. Referring to FIG. 3, in an exemplary embodiment, the cover 50 is detachably disposed to the housing 10. The housing 10 includes a connecting portion 14 and a restriction portion 16. The connecting portion 14 is a cylindrical shape axially parallel to the first direction Z. A plurality of first engaging parts 142 protrude from the outer surface of the connecting portion 14 and are uniformly arranged along the circumference of the connecting portion 14. The restriction portion 16 is provided at one end, which is in the axial direction, of the connecting portion 14 and has a larger diameter than the connecting portion 14. A plurality of second engaging parts 52 are projected from the inner side of the cover 50. Referring to FIG. 2, the cover 50 can be coaxially sleeved on the connecting portion 14. The cover 50 is rotated about its axis to move the second engaging parts 52 to engage the first engaging parts 142 after the restriction portion 16 contacts the cover 50. For example, the second engaging parts 52 and the first engaging parts 142 are engaged to each other in one-to-one correspondence.

At this time, each second engaging part 52 is abutted against the side, which is closer to the restriction portion 16, of each first engaging part 142. The first engaging parts 142 and the restriction portion 16 are against each other and fix the cover 50 in two directions. The cover 50 and the housing 10 are detachably mounted by the above structure. It is easy to disassemble when cleaning the cover 50. However, it is not limited thereto. In other exemplary embodiments, the cover 50 and the housing 10 may also adopt other detachable connection assemblies.

In an exemplary embodiment, referring to FIG. 3, a plurality of blocking parts 144 further protrude from the outer surface of the connecting portion 14. The blocking parts 144 block the second engaging parts 52 from continuing to move when second engaging parts 52 engage first engaging parts 142 at the sides closer to the restriction portion 16. Therefore, when the second engaging parts 52 abut against the restriction portion 16, the blocking part 144 can prevent the cover 50 from continuing to rotate and prevent the second engaging part 52 from disengaging from the restriction portion 16. In the exemplary embodiment, The blocking part and the first engaging part are integrally formed, which is convenient for manufacturing but are not limited thereto. In other exemplary embodiments, the blocking parts and the first engaging parts may be separate and independent structures. The blocking parts 144 facilitate the mounting of the cover 50 and the housing 10.

In an exemplary embodiment, referring to FIGS. 2 and 3, the surface of the second portion 19 that is perpendicular to the first direction Z is an operating surface 18. The heating device further comprises a plurality of switches 70 that are capable of controlling the drive member 20 and the heating member 40 respectively. The switches 70 are set on the operation surface 18.

In an exemplary embodiment, two concave members 17 are formed at the second portion 19. The concave members are in the opposite direction from each other on the second portion 19 so that two concave members form a handle for the user to pick up. In FIG. 3, the concave members are recessed towards the center of the housing 10.

The second portion 19 further includes a plurality of apertures 15 communicating with the cavity 12 so that the air can be discharged through these apertures 15.

The heating device has a frying function, is simple in structure, and is easy for the user to grasp.

Figure 4:
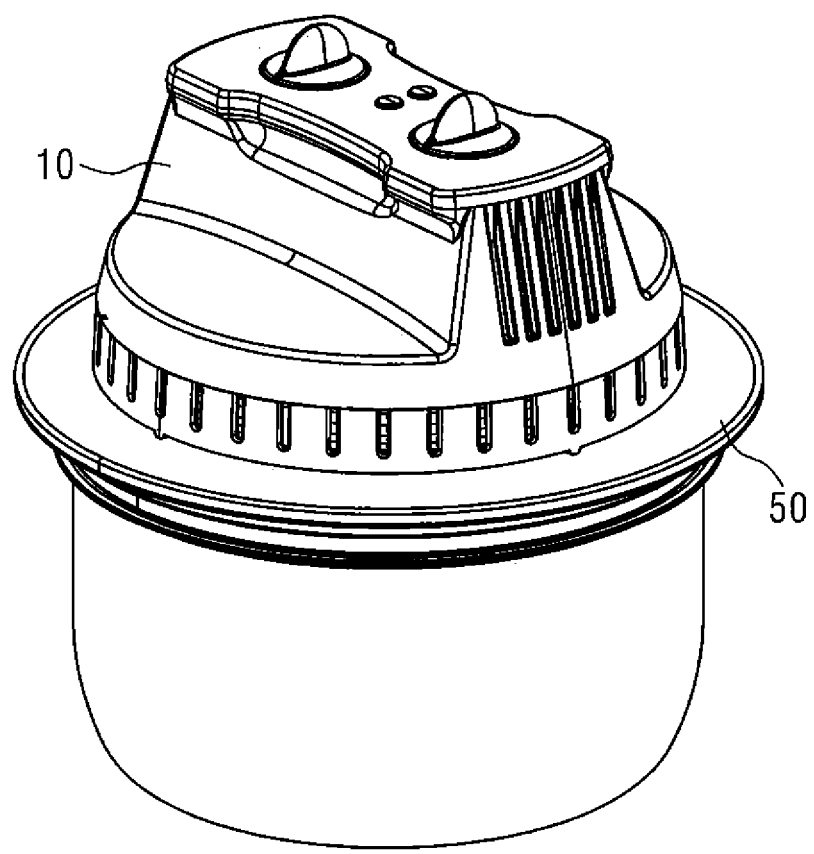
FIG. 4 is a perspective view showing an exemplary air fryer.

In an exemplary embodiment, there is also provided an air fryer comprising the above heating device and a plurality of pots. The pots have openings of different diameters. The annular steps of the cover 50 can match the openings of the different pots. For example, the diameters of the steps of the cover 50 are the same as the diameters of the different openings of the pots. Therefore; the annular steps with different diameters are suitable for pots of different sizes, as shown in FIG. 4. With only one heating device and several pots, the user can cook different sizes of food, which saves storage space and cost.

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

What is claimed is:

1. A heating device for an air fryer, comprising:
   a housing with the cavity, wherein the housing includes a first portion downstream and a second portion upstream along a first direction, the first portion has a plurality of holes communicating with the cavity;
   a driving member disposed in the cavity of the housing and including a driving shaft extending along the first direction;
   a fan disposed on the driving shaft and facing the holes;
   a heating member disposed between the fan and the plurality of holes; and
   a cover with an annular stepped shape, which is sleeved on and detachably mounted on the housing, the cover having an axis that extends along the first direction, and diameters of the annular steps of the outer surface of the cover gradually decrease along the first direction,
   wherein the housing comprises:
      a cylindrical connecting portion having an outer surface and an axis that extends along the first direction, wherein the connecting portion comprises a plurality of first engaging parts which project from the outer surface of the connecting portion and are uniformly arranged along the circumference of the connecting portion, and
      a restriction portion disposed at one end of the connecting portion and having a larger diameter than the diameter of the connecting portion,
   wherein the cover is coaxially sleeved on the connecting portion and comprises a plurality of second engaging parts protruding from an inner side of the cover; and
   wherein the cover is configured to rotate about its axis to move the second engaging parts to engage the first engaging parts.

2. The heating device according to claim 1, wherein the cylindrical connecting portion further comprises a plurality of blocking parts protruding from the outer surface of the connecting portion, the blocking parts configured to prevent the second engaging parts from continuing to move when the second engaging parts engaging the first engaging parts.

3. The heating device according to claim 1, wherein the cover is transparent and made of heat resistant material.

4. The heating device according to claim 1, wherein, the housing further comprises switches disposed on the second portion and configured to control the driving member and the heating member.

5. The heating device according to claim 4, wherein the housing is formed with two oppositely disposed concave members on opposite sides of the second portion.

6. The heating device according to claim 5, wherein the housing further comprises a plurality of apertures that communicate with the cavity.

7. An air fryer comprises:
   a pot exhibiting a selected one of different diameter openings; and
   the heating device according to any one of claims 1 to 6, the heating device disposed on the opening of a selected pot, such that the diameter of the selected pot is in a one-to-one correspondence with the diameter of one of the annular steps of the cover.

* * * * *